UNITED STATES PATENT OFFICE.

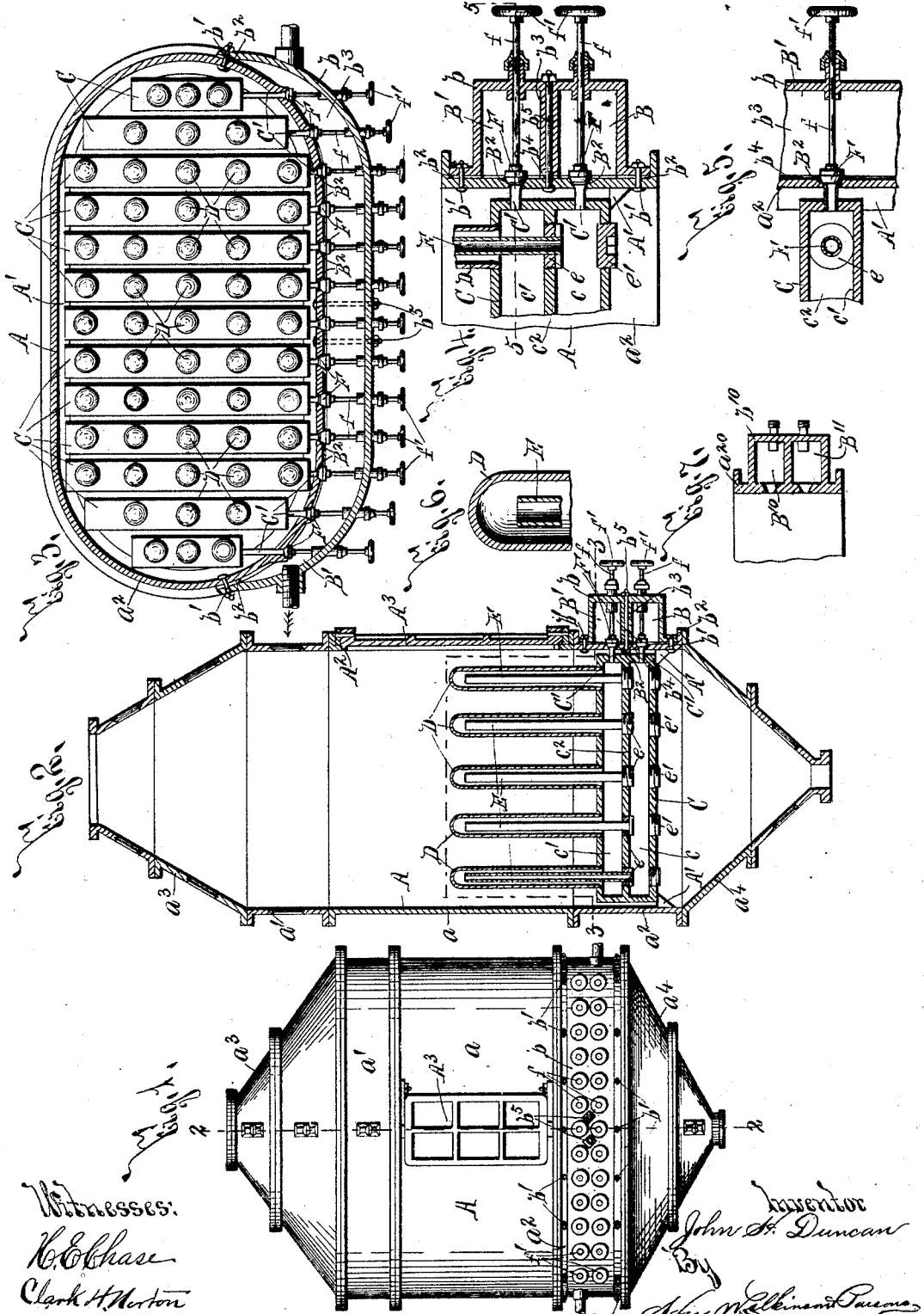

JOHN H. DUNCAN, OF SYRACUSE, NEW YORK.

VACUUM-PAN.

SPECIFICATION forming part of Letters Patent No. 503,312, dated August 15, 1893.

Application filed April 17, 1893. Serial No. 470,593. (No model.)

*To all whom it may concern:*

Be it known that I, JOHN H. DUNCAN, of Syracuse, in the county of Onondaga and State of New York, have invented new and useful Improvements in Vacuum-Pans, of which the following, taken in connection with the accompanying drawings, is a full, clear, and exact description.

My invention relates to improvements in vacuum pans of the same general class as that described in my pending application, Serial No. 434,931, filed May 31, 1892, and has for its object the production of an efficient device, which is particularly applicable for evaporating brine in the manufacture of salt, is extremely simple and effective, is easily and practically operated, and repaired, and is so constructed as to permit one of its heating heads to remain inoperative without preventing or checking the operation of the remaining heating heads; and to this end it consists, essentially, in a vacuum pan having one side provided with inlet and outlet chambers, a series of closed heating heads within the vacuum pan formed separable from said pan and provided with inlet and outlet chambers and with projecting heating tubes, connections between the corresponding chambers of the vacuum pan and the closed heating heads, and valves at one side of the vacuum pan for regulating the passage through said connections.

The invention furthermore consists in the detail construction and arrangement of the parts, all as hereinafter more particularly described and pointed out in the claims.

In describing this invention, reference is had to the accompanying drawings, forming a part of this specification, in which, like letters indicate corresponding parts in all the views.

Figure 1 is an elevation of my improved vacuum pan. Fig. 2 is a longitudinal vertical sectional view, taken on line —2—2—, Fig. 1. Fig. 3 is a horizontal transverse sectional view, taken on line —3—3—, Fig. 2. Fig. 4 is an enlarged vertical sectional view of a portion of the central section of the vacuum pan, and the adjacent portion of the closed head as shown in smaller scale at the right-hand of Fig. 2. Fig. 5 is a horizontal sectional view, taken on line —5—5—, Fig. 4. Fig. 6 is an enlarged sectional view of the upper end of one of the heating tubes, and Fig. 7 is a sectional view of a detached portion of the central section of a vacuum pan embodying a modified form of my invention.

The vacuum pan —A— is composed of central, upper, and lower sections —$a$—$a'$—$a^2$— formed with upright walls and with rounding ends and upper and lower conical sections —$a^3$—$a^4$—. One side of the pan —A— is formed with inlet and outlet chambers —B— B'— for admitting and withdrawing the heating agent, as steam. As preferably constructed these chambers are formed or inclosed by a portion of the wall of the vacuum pan section —$a^2$— and a hollow frame or shell —$b$— arranged lengthwisely at the outside of said portion of the wall of said vacuum pan section. The frame or shell —$b$— is preferably formed separable from the vacuum pan section —$a^2$—, and is secured thereto by bolts —$b'$— passed through the wall of the vacuum pan section, and flanges upon the frame —$b$—. A packing ring —$b^2$— is interposed between the flanges of the frame —$b$— and the wall of the vacuum pan section, and the frame —$b$— is formed with a central partition or rib —$b^3$—, which extends from one end of the frame —$b$— to its opposite extremity, and is separated from the wall of the vacuum pan section by a packing strip —$b^4$—. Bolts —$b^5$— passed through the partition —$b^3$— additionally secure the frame —$b$— in position.

—C—C— represent closed heads arranged within the vacuum pan section and formed separable therefrom. These heads are of substantially the same construction as those shown in my aforesaid application, and are provided with inlet and outlet chambers —$c$—$c'$— arranged one above the other, and with a lengthwise partition —$c^2$— interposed between said chambers. The opposite extremities of the heads —C— are supported on shoulders —A'—A'— projecting from the inner face of the vacuum pan section —$a^2$—, and the corresponding ends of said closed heads are provided with connections or pipes —C'—C'— having their inner ends opening from the inlet and outlet chambers of the closed heads —C—, and their outer ends discharging into the corresponding chambers in the wall of the vacuum pan. I preferably use short tubes having substantially thin walls for these connections, and flange or expand their outer ends in the inner extremities of openings —B²— in the wall of the vacuum pan section —a²— leading into the chambers —B—B'—. It is evident, however, that instead of using the short tubes —C'—C'— I may interpose packing rings between the perforated ends of the heads —C— and the adjacent portion of the wall of the vacuum pan section —a²— and draw said parts together by screw bolts or other clamps. It is, however, unnecessary to illustrate or further describe this construction, as it is evident to one skilled in the art.

—D—D— are heating tubes projecting upwardly from the upper wall of the closed heads —C— and having their upper ends closed, as clearly seen at Figs. 2, 3, and 6, and their lower ends opening into the outlet chamber —c'— of said heads, and —E—E— are pipes having their upper ends discharging within the tubes —D—D— and their lower ends secured to hollow plugs —e—e— removably mounted in the partition —c²—.

—e'—e'— are hollow plugs aligned with the plugs —e—e— for permitting the removal and insertion into operative position of the hollow plugs —e—e—. The central section —a— of the vacuum pan —A— is formed with an opening —A²— and a door —A³— for closing said opening, and, as clearly seen at Fig. 2, this opening —A²— is of greater height than the combined height of any of the heads —C— and the tubes —D— projecting therefrom in order to permit of the ready entrance and withdrawal of said head and tubes. When desired to withdraw the heads, the connections —C'—C'— are readily severed by a suitable cutting tool.

—F—F— are valves movable toward and away from valve seats formed in the outer ends of the openings —B²—B²— and —f—f— are valve stems projecting beyond said valves and provided with operating or hand pieces —f'—f'— arranged one above the other at the outside of the frame or shell —b—. By means of the valves —F—F— the passage of the heating fluid to the heating heads —C— is regulated at will from one side of the vacuum pan, and one head may be entirely shut off without preventing the operation of the remaining heads.

At Fig. 7 I have shown a modified form of my invention in which the vacuum pan section —a²⁰— is provided with an integral frame or hollow rib —b¹⁰— containing the chambers —B¹⁰—B¹¹—.

The operation of my invention will be readily perceived from the foregoing description and upon reference to the drawings, and it will be particularly noted that the same is simple and practical in construction, is readily assembled in operative position; that the closed heating heads are readily inserted and withdrawn from the vacuum pan, and are so constructed as to permit of the ready repair or replacement of their heating tubes or heating fluid conducting pipes, and that the peculiar arrangement of the inlet and outlet chambers of the vacuum pan, and the valves for regulating the passage of the heating fluid to the closed heads within the vacuum pan is such as to permit of the easy and practical operation of the vacuum pan, and to permit of the shutting off of one of the closed heads without affecting the operation of the remaining heads.

It will be understood, however, that the detail construction and arrangement of the parts of my vacuum pan may be considerably varied without departing from the spirit of my invention, hence I do not herein specifically limit myself to such exact detail construction and arrangement.

Having thus fully described my invention, what I claim as new, and desire to secure by Letters Patent, is—

1. The combination of a vacuum pan having one side provided with an inlet and an outlet chamber, a closed head arranged within the vacuum pan and provided with inlet and outlet chambers, connections, substantially as described, at one end of said head between the corresponding chambers of said pan and head, and independent valves for opening and closing said connections provided with operating pieces at the outside of the chambers of the vacuum pan, substantially as and for the purpose set forth.

2. The combination of a vacuum pan having one side provided with an inlet and an outlet chamber, a closed head removably secured within the vacuum pan and provided with inlet and outlet chambers, a door for the vacuum pan for permitting entrance and removal of the head, and connections, substantially as described, at one end of said head between the corresponding chambers of said pan and head, substantially as specified.

3. The combination of a vacuum pan having one side provided with an inlet and an outlet chamber, a closed head removably secured within the vacuum pan and provided with inlet and outlet chambers, a door for the vacuum pan for permitting entrance and removal of the head, connections, substantially as described, at one end of said head between the corresponding chambers of said pan and head, and valves for opening and closing said connections provided with operating pieces at the outside of the chambers of the vacuum pan, substantially as and for the purpose set forth.

4. The combination of a vacuum pan having one side provided with an inlet and an outlet chamber, a series of closed heads removably secured within the vacuum pan and provided with inlet and outlet chambers and with projecting heating tubes, a door for the vacuum pan for permitting entrance and removal of the closed heads, and connections, substantially as described, at one end of said heads between the corresponding chambers of said pan and closed heads, substantially as and for the purpose described.

5. The combination of a vacuum pan having one side provided with an inlet and an outlet chamber arranged one above the other, a series of closed heads supported within the vacuum pan and provided with inlet and outlet chambers arranged one above the other and with projecting heating tubes, connections arranged one above the other at one end of said heads between the corresponding chambers of said vacuum pan and closed heads, and valves disposed one above the other for opening and closing said connections and provided with operating pieces at the outside of the chambers of the vacuum pan, substantially as and for the purpose specified.

6. The combination of a vacuum pan having one side provided with an inlet and an outlet chamber, a closed head within the vacuum pan formed separable from the pan and provided with inlet and outlet chambers and an intervening partition, connections at one end of said head between the corresponding chambers of said vacuum pan and closed head, a tube extending outwardly from said head and having its outer end closed and its opposite end connected to the outlet chamber of the head, a pipe extending outwardly from the inlet chamber of the head and having its outer end discharging into said tube and its opposite end connected to said inlet chamber, a hollow plug removably secured to the partition for supporting said pipe, and a solid plug aligned with the hollow plug and removably secured to the wall of said head, substantially as and for the purpose set forth.

7. The combination of a vacuum pan, a hollow shell or frame removably secured to the wall of said vacuum pan and provided with a partition extending from opposite sides thereof, whereby said shell or frame in connection with the adjacent portion of the wall of the vacuum pan forms an inlet and an outlet chamber, a closed head arranged within the vacuum pan and formed separable therefrom and provided with inlet and outlet chambers, and connections, substantially as described, at one end of said head between the corresponding chambers of said pan and head, substantially as specified.

8. The combination of a vacuum pan having one side provided with inlet and outlet chambers and with openings aligned with said chambers and formed at their outer ends with valve seats, a closed head arranged within the vacuum pan and formed separable therefrom and provided with inlet and outlet chambers, pipes opening from the chambers of said head and having their outer ends secured in the inner ends of said openings in the wall of the vacuum pan, and valves movable toward and away from said valve seats for regulating the passage to the chambers of the closed head, substantially as and for the purpose specified.

9. The combination with a vacuum pan having opposite substantially flat upright walls and rounding ends, one side being provided with an inlet and an outlet chamber arranged one above the other; of a series of independent closed heating heads formed separate from said vacuum pan and removably supported therein, said heads standing parallel with each other and extending lengthwisely between said substantially flat upright walls, each head being provided with inlet and outlet chambers, connections at one end of said heads between the corresponding inlet and outlet chambers of the pan and heads, a valve in each connection, a number of tubes rising from the outlet chamber of each head and having their upper ends closed, a number of pipes rising from the inlet chamber of each head into said tubes and discharging within the closed end thereof, and means for conveying a heated fluid to the inlet chamber of the pan, as and for the purpose set forth.

In testimony whereof I have hereunto signed my name, in the presence of two attesting witnesses, at Syracuse, in the county of Onondaga, in the State of New York, this 18th day of March, 1893.

JOHN H. DUNCAN.

Witnesses:
CLARK H. NORTON,
M. BAXTER.